W. M. McEWEN.
TIRE CASING FILLER.
APPLICATION FILED NOV. 5, 1920.
1,414,478. Patented May 2, 1922.
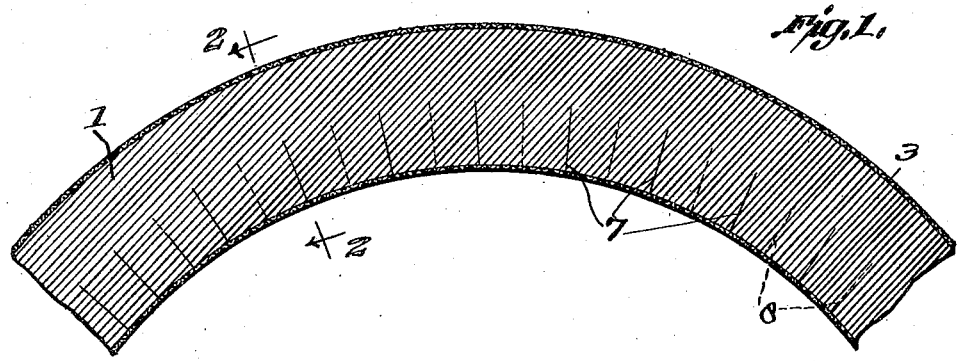
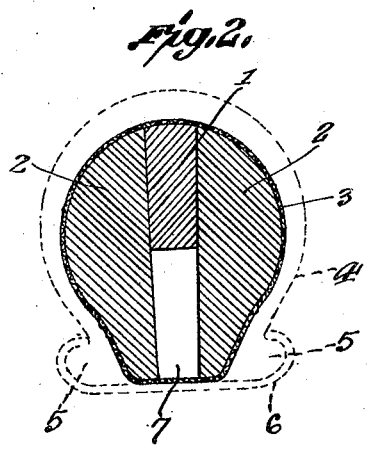
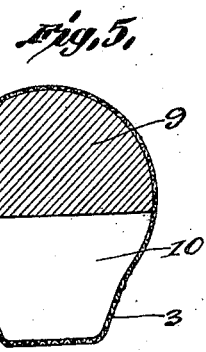
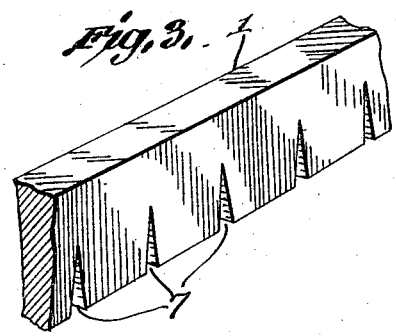
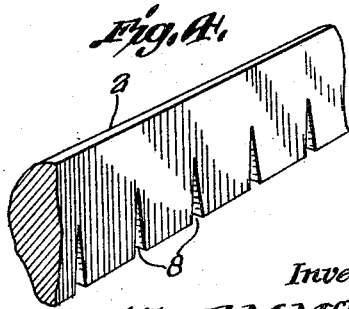
Inventor
Willard M. McEwen
by Eugene Cowan Atty.

UNITED STATES PATENT OFFICE.

WILLARD M. McEWEN, OF CHICAGO, ILLINOIS.

TIRE-CASING FILLER.

1,414,478.    Specification of Letters Patent.    Patented May 2, 1922.

Application filed November 5, 1920. Serial No. 421,838.

*To all whom it may concern:*

Be it known that I, WILLARD M. McEWEN, a citizen of the United States, residing at Chicago, in the county of Cook and State of Illinois, have invented new and useful Improvements in Tire-Casing Fillers, of which the following is a specification.

This invention relates to improvements in tire casing fillers, such as are adapted as reliable substitutes for inflatable inner tubes of pneumatic tires.

At present in making fillers which comprise a body portion composed of vertically arranged center and side strips, all of resilient solid rubber, or with the two side strips of sponge rubber, it is customary to make the several strips in a tubing machine. The rubber is ground up, steamed, heated and forced out through a die in the shape desired, and comes out in a continuous strip; when an appropriate length has been run, it is cut off. The three strips, the rectangular center one and the two substantially semicircular side ones, are placed together to make the body of the filler conform to the interior transverse shape of a tire casing, and the ends of the body are brought together to make the filler annular in form, whereupon the filler is wrapped with fabric, and then forced in a mold, closed and placed in a vulcanizer for heating and curing.

For a small size tire, such as used on a Ford, the outer circumference of the filler is about ten inches longer than its inner circumference, and the bringing of the ends of the filler together to make the filler annular in form compresses the material along the inner circle and extends or stretches the outer one. When the filler is forced into the mold, there is no way of stretching the outer circumference and necessarily the adjustment must come through the compression of the inner. The result of this is that the material along the inner circle is noticeably harder than that along the outer one and, the center strip being solid, the vibration is carried through that strip directly to the rim of the wheel, instead of being absorbed and diffused entirely by the softer rubber portions before reaching the rim.

The object of my invention is to provide the body of the filler with a plurality of transverse notches, spaced apart circumferentially about the filler and extending into the same from the inner circle, the material removed in making the notches being substantially equal to the surplus material which would be present on bending the filler in annular form if no notches were provided. This allows the filler being bent in annular form without noticeably compressing the material along the inner circle, with the result that such material retains its desired degree of resiliency and shocks and vibrations are not transmitted to the rim of the wheel, but are absorbed and diffused by the soft portions of the filler before reaching the rim.

The invention consists further in the matters hereinafter described and more particularly pointed out in the appended claims.

In the accompanying drawings—

Fig. 1 is a fragmentary longitudinal sectional view through a tire casing filler embodying the features of my invention;

Fig. 2 is a transverse sectional view taken on line 2—2 of Fig. 1;

Figs. 3 and 4 are perspective views of the center strip and one of the side strips, respectively; and Fig. 5 is a transverse sectional view through a filler made initially of one strip of solid rubber and notched in accordance with my invention.

The filler shown in Figs. 1 to 4 comprises a body portion composed of three strips, all of resilient solid rubber, the center strip 1 being stiffer and having less resiliency than the two side strips 2, 2. The two latter strips are vulcanized to the center one and when secured together give the filler a transverse shape conforming to the interior transverse shape of a tire casing or shoe. These strips extend the full length of the filler and, when the filler is given an annular form with the ends of the filler together, the assembled strips are wrapped in a fabric jacket 3, placed in a mold and treated as before stated. The customary tire casing or shoe 4, in which the filler is placed, is provided with clincher beads 5, 5 on opposite sides thereof to engage under the inturned side edges of the rim 6, as shown in Fig. 2.

After the strips are made by a tubing machine and cut to length, and before being vulcanized together in the fabric jacket 3, each strip is provided with a plurality of notches, the ones in the center strip 1 being designated by 7 and those in each of the side strips 2 by the numeral 8. These notches extend into the strip from the inner circle and clear across the same, as shown. The notches are made V-shape, and in making them a certain amount of material is removed from the strips as initially made, so that when the strips are placed together in the casing 3 and bent into annular form there is practically no compression of the material along the inner circle, as the notches have removed substantially all surplus material which would be present if the notches were omitted. This results therefore in allowing the inner circumference of the filler to possess substantially the same degree of resiliency as possessed by the filler as originally made, and thus there is no hardened rubber portion along and adjacent the inner circumference to transmit road shocks and vibrations directly to the rim of the wheel.

The arrangement of the notches in the center and side strips 1 and 2 is preferably such that the notches are in staggered relation. That is, the notches of the side strips 2 are staggered with respect to the notches in the center strip, as indicated in Figs. 1 and 2.

In Fig. 5, I have shown a tire casing filler 9, made originally from a single strip which is forced out of the rubber machine through a die having a shape conforming to the inner cross-sectional shape of a tire casing. This strip 9 is also provided with a plurality of notches 10 extending transversely across the same from the inner circumference or circle thereof, as in the filler shown in the preceding figures. These notches 10 serve to accomplish the same purpose as the notches 7 and 8.

I claim as my invention:

1. A tire casing filler comprising a body portion of resilient rubber and adapted to be bent into annular form, portions of the body portion about the inner edge thereof being removed, before bending the body portion into annular form, by cutting a plurality of transverse notches into the body portion from its inner edge, to avoid compressing any of the material of the body portion along said inner edge when bending the body portion into annular form, the contacting faces of the notches being vulcanized together after the body portion is in annular form.

2. A tire casing filler comprising a body portion composed of a plurality of vertically arranged strips of resilient rubber vulcanized together, portions of said strips along the inner edges thereof being removed, before securing the strips together and bending into annular form, by cutting a plurality of transverse notches into the strips from said inner edges, to prevent compressing any of the material of said strips along their inner edges when bending the body portion into annular form, the contacting faces of the notches being vulcanized together after the body portion is in annular form.

3. A tire casing filler comprising a body portion composed of three vertically arranged strips, a center strip and two side strips, all of resilient rubber and vulcanized together, the center strip having a resiliency less than the side strips and serving to support the normal load on the tire, each strip having portions along the inner edge thereof removed, before being secured to the other strip and bent into annular form, by cutting a plurality of transverse notches into the strip from its inner edge, to avoid compressing any of the material of the strip along its inner edge when bending the strip into annular form, the contacting faces of the notches being vulcanized together after the body portion is in annular form.

4. A tire casing filler comprising a body portion composed of three vertically arranged strips, a center strip and two side strips, all of resilient rubber and vulcanized together, the center strip having a resiliency less than the side strips and serving to support the normal load on the tire, portions of said strips along the inner edges thereof being removed, before securing the strips together and bending into annular form, by cutting a plurality of transverse notches into said strips from the inner edges thereof, to avoid compressing the material of the strips along said inner edges when bending the body portion into annular form, the notches in one strip being staggered with respect to the notches in the adjacent strip, and the contacting faces of the notches being vulcanized together after the body portion is in annular form.

In testimony that I claim the foregoing as my invention, I affix my signature, this 2nd day of November, A. D., 1920.

WILLARD M. McEWEN.